United States Patent
Henry et al.

(10) Patent No.: US 11,736,723 B2
(45) Date of Patent: *Aug. 22, 2023

(54) METHOD OF CODING AND DECODING IMAGES, CODING AND DECODING DEVICE AND COMPUTER PROGRAMS CORRESPONDING THERETO

(71) Applicant: DOLBY INTERNATIONAL AB, Amsterdam Zuidoost (NL)

(72) Inventors: Felix Henry, Saint Gregoire (FR); Stephane Pateux, Rennes (FR)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,735

(22) Filed: May 23, 2022

(65) Prior Publication Data
US 2022/0360817 A1 Nov. 10, 2022

Related U.S. Application Data

(63) Continuation of application No. 16/895,192, filed on Jun. 8, 2020, now Pat. No. 11,343,535, which is a
(Continued)

(30) Foreign Application Priority Data

Mar. 7, 2011 (FR) ...................................... 1151849

(51) Int. Cl.
*H04N 19/593* (2014.01)
*H04N 19/50* (2014.01)
(Continued)

(52) U.S. Cl.
CPC ........... *H04N 19/593* (2014.11); *H04N 19/13* (2014.11); *H04N 19/174* (2014.11);
(Continued)

(58) Field of Classification Search
CPC .... H04N 19/13; H04N 19/174; H04N 19/184; H04N 19/25; H04N 19/436; H04N 19/50;
(Continued)

(56) References Cited

U.S. PATENT DOCUMENTS 6,480,537 B1 11/2002 Agarwal et al.
6,900,748 B2  5/2005 Marpe et al.
(Continued)

FOREIGN PATENT DOCUMENTS

CN 1299560 A 6/2001
CN 1489391 4/2004
(Continued)

OTHER PUBLICATIONS

Huang et al. "Ordered Entropy Slices for Parallel CODEC", Jul. 5, 2009 (Jul. 5, 2009), Video Coding Experts Group of ITU-T SG.16, 38th VCEG Meeting; Jul. 2009.*
(Continued)

*Primary Examiner* — Mohammed S Rahaman

(57) ABSTRACT

A method of coding at least one image comprising the steps of splitting the image into a plurality of blocks, of grouping said blocks into a predetermined number of subsets of blocks, of coding each of said subsets of blocks in parallel, the blocks of a subset considered being coded according to a predetermined sequential order of traversal. The coding step comprises, for a current block of a subset considered, the sub-step of predictive coding of said current block with respect to at least one previously coded and decoded block, and the sub-step of entropy coding of said current block on the basis of at least one probability of appearance of a symbol.

2 Claims, 8 Drawing Sheets

Related U.S. Application Data continuation of application No. 16/418,343, filed on May 21, 2019, now Pat. No. 10,681,376, which is a continuation of application No. 15/419,870, filed on Jan. 30, 2017, now Pat. No. 10,382,784, which is a continuation of application No. 15/003,148, filed on Jan. 21, 2016, now Pat. No. 9,628,818, which is a continuation of application No. 14/492,546, filed on Sep. 22, 2014, now Pat. No. 9,271,012, which is a continuation of application No. 14/003,014, filed as application No. PCT/FR2012/050380 on Feb. 23, 2012, now Pat. No. 9,560,380.

(51) Int. Cl.
*H04N 19/13* (2014.01)
*H04N 19/61* (2014.01)
*H04N 19/91* (2014.01)
*H04N 19/174* (2014.01)
*H04N 19/436* (2014.01)
*H04N 19/25* (2014.01)
*H04N 19/184* (2014.01)
*H04N 19/51* (2014.01)

(52) U.S. Cl.
CPC ........... *H04N 19/184* (2014.11); *H04N 19/25* (2014.11); *H04N 19/436* (2014.11); *H04N 19/50* (2014.11); *H04N 19/51* (2014.11); *H04N 19/61* (2014.11); *H04N 19/91* (2014.11)

(58) Field of Classification Search
CPC ...... H04N 19/51; H04N 19/593; H04N 19/61; H04N 19/91
See application file for complete search history.

(56) References Cited

U.S. PATENT DOCUMENTS

| | | | |
|---|---|---|---|
| 7,221,483 B2 | 5/2007 | Yagishita et al. | |
| 7,463,781 B2 | 12/2008 | Pearson et al. | |
| 8,319,672 B2 | 11/2012 | Kim et al. | |
| 8,520,740 B2 | 8/2013 | Flachs et al. | |
| 8,824,813 B2 | 9/2014 | Sasaki | |
| 8,953,692 B2 | 2/2015 | Tanaka et al. | |
| 9,042,457 B2 | 5/2015 | Hayashi | |
| 9,271,012 B2 | 2/2016 | Henry et al. | |
| 9,319,692 B2 | 4/2016 | Henry et al. | |
| 9,319,693 B2 | 4/2016 | Henry et al. | |
| 9,319,694 B2 | 4/2016 | Henry et al. | |
| 9,338,469 B2 | 5/2016 | Amon | |
| 9,380,308 B2 | 6/2016 | Henry et al. | |
| 9,560,380 B2 | 1/2017 | Henry et al. | |
| 9,628,818 B2 | 4/2017 | Henry et al. | |
| 9,648,325 B2 | 5/2017 | Baeza | |
| 9,654,783 B2 | 5/2017 | Henry et al. | |
| 9,661,335 B2 | 5/2017 | Henry et al. | |
| 9,848,196 B2 | 12/2017 | Henry et al. | |
| 10,033,999 B2 | 7/2018 | Henry et al. | |
| 10,362,311 B2 | 7/2019 | Henry et al. | |
| 10,382,784 B2 | 8/2019 | Henry et al. | |
| 10,681,376 B2 | 6/2020 | Henry et al. | |
| 10,694,186 B2 | 6/2020 | Henry et al. | |
| 11,343,535 B2 | 5/2022 | Henry et al. | |
| 2002/0021234 A1 | 2/2002 | Yanagiya et al. | |
| 2003/0081850 A1* | 5/2003 | Karczewicz | H04N 19/61 375/E7.161 |
| 2004/0066852 A1 | 4/2004 | MacInnis | |
| 2004/0179601 A1 | 9/2004 | Kobayashi et al. | |
| 2005/0008079 A1 | 1/2005 | Boon et al. | |
| 2005/0038837 A1 | 2/2005 | Marpe et al. | |
| 2005/0123207 A1 | 6/2005 | Marpe | |
| 2005/0232505 A1 | 10/2005 | Pearson et al. | |
| 2006/0008079 A1 | 1/2006 | Daemon et al. | |
| 2006/0092271 A1 | 5/2006 | Banno et al. | |
| 2006/0233239 A1 | 10/2006 | Sethi et al. | |
| 2007/0201559 A1 | 8/2007 | He | |
| 2007/0280345 A1 | 12/2007 | Tu et al. | |
| 2008/0056347 A1 | 3/2008 | Chiu et al. | |
| 2008/0219349 A1 | 9/2008 | Huang et al. | |
| 2008/0240242 A1 | 10/2008 | Lainema et al. | |
| 2008/0246637 A1 | 10/2008 | Chen et al. | |
| 2008/0279182 A1 | 11/2008 | Hafeez et al. | |
| 2008/0310504 A1 | 12/2008 | Ye et al. | |
| 2009/0135886 A1 | 5/2009 | Robertson et al. | |
| 2009/0168868 A1 | 7/2009 | Jahanghir | |
| 2009/0175331 A1 | 7/2009 | Karczewicz et al. | |
| 2009/0180536 A1 | 7/2009 | Shimofure | |
| 2009/0201949 A1 | 8/2009 | Sunahara | |
| 2009/0225234 A1 | 9/2009 | Ward et al. | |
| 2009/0245349 A1* | 10/2009 | Zhao | H04N 19/61 375/240.03 |
| 2009/0245392 A1 | 10/2009 | Leung et al. | |
| 2009/0279613 A1 | 11/2009 | Suzumura | |
| 2010/0052956 A1 | 3/2010 | Choo et al. | |
| 2010/0098155 A1 | 4/2010 | Demircin et al. | |
| 2010/0135416 A1* | 6/2010 | Huang | H04N 19/91 375/E7.2 |
| 2010/0215030 A1 | 8/2010 | Agrawal et al. | |
| 2010/0238998 A1 | 9/2010 | Nanbu et al. | |
| 2010/0322317 A1 | 12/2010 | Yoshimatsu et al. | |
| 2010/0328503 A1 | 12/2010 | Shintani et al. | |
| 2011/0069899 A1 | 3/2011 | Reese | |
| 2011/0243226 A1 | 10/2011 | Choi et al. | |
| 2011/0317769 A1 | 12/2011 | Tanaka et al. | |
| 2012/0014429 A1 | 1/2012 | Zhao et al. | |
| 2012/0014433 A1 | 1/2012 | Karczewicz et al. | |
| 2012/0039393 A1 | 2/2012 | Borg et al. | |
| 2012/0082215 A1 | 4/2012 | Sze et al. | |
| 2012/0163448 A1 | 6/2012 | Zheng et al. | |
| 2012/0163452 A1 | 6/2012 | Horowitz et al. | |
| 2012/0183074 A1 | 7/2012 | Fuldseth | |
| 2012/0207213 A1 | 8/2012 | Amon | |
| 2012/0219066 A1 | 8/2012 | Amonou et al. | |
| 2012/0263232 A1 | 10/2012 | Pateux et al. | |
| 2012/0293343 A1 | 11/2012 | Lee et al. | |
| 2012/0314944 A1 | 12/2012 | Ninan et al. | |
| 2013/0016771 A1 | 1/2013 | Misra | |
| 2013/0021350 A1 | 1/2013 | Schmit et al. | |
| 2013/0114000 A1 | 5/2013 | Atkins | |
| 2013/0187798 A1 | 7/2013 | Marpe et al. | |
| 2013/0279606 A1 | 10/2013 | Vanam et al. | |
| 2014/0010312 A1 | 1/2014 | Song | |
| 2014/0016700 A1 | 1/2014 | Henry et al. | |
| 2014/0254665 A1 | 9/2014 | Henry et al. | |
| 2014/0334557 A1 | 11/2014 | Schierl et al. | |
| 2015/0010088 A1 | 1/2015 | Henry et al. | |
| 2015/0016524 A1 | 1/2015 | Henry et al. | |
| 2015/0195537 A1 | 7/2015 | Henry et al. | |
| 2015/0195538 A1 | 7/2015 | Henry et al. | |
| 2016/0142720 A1 | 5/2016 | Henry et al. | |
| 2016/0142733 A1 | 5/2016 | Henry et al. | |
| 2016/0150250 A1 | 5/2016 | Henry et al. | |
| 2016/0234512 A1 | 8/2016 | Henry et al. | |
| 2017/0142441 A1 | 5/2017 | Henry et al. | |
| 2017/0223353 A1 | 8/2017 | Henry et al. | |
| 2018/0302632 A1 | 10/2018 | Henry et al. | |
| 2019/0273947 A1 | 9/2019 | Henry et al. | |
| 2019/0297323 A1 | 9/2019 | Henry et al. | |
| 2020/0322609 A1 | 10/2020 | Henry et al. | |
| 2021/0021867 A1 | 1/2021 | Henry et al. | |

FOREIGN PATENT DOCUMENTS

| | | |
|---|---|---|
| CN | 1527610 | 9/2004 |
| CN | 1547854 | 11/2004 |
| CN | 1703089 | 11/2005 |
| CN | 1717050 | 1/2006 |
| CN | 1926769 | 3/2007 |
| CN | 101068359 | 11/2007 |
| CN | 101198051 | 6/2008 |
| CN | 101411197 | 4/2009 |
| CN | 101490968 | 7/2009 |

(56) References Cited

FOREIGN PATENT DOCUMENTS

| | | |
|---|---|---|
| CN | 101491097 | 7/2009 |
| CN | 101543071 | 9/2009 |
| CN | 101653003 | 2/2010 |
| CN | 101682771 | 3/2010 |
| CN | 101836454 | 9/2010 |
| CN | 101841700 | 9/2010 |
| CN | 101977327 | 2/2011 |
| CN | 101981934 | 2/2011 |
| JP | H0723397 | 1/1995 |
| JP | H08116534 | 5/1996 |
| JP | 2005033336 | 2/2005 |
| JP | 2005223533 | 8/2005 |
| JP | 2006101406 | 4/2006 |
| JP | 2006141037 | 6/2006 |
| JP | 2006279574 | 10/2006 |
| JP | 2007020002 | 1/2007 |
| JP | 2007504757 | 3/2007 |
| JP | 2007142637 | 6/2007 |
| JP | 2007166192 | 6/2007 |
| JP | 2007520912 | 7/2007 |
| JP | 2007300455 | 11/2007 |
| JP | 2008011204 | 1/2008 |
| JP | 2008067026 | 3/2008 |
| JP | 2008537373 | 9/2008 |
| JP | 2009111605 | 5/2009 |
| JP | 200927306 | 11/2009 |
| JP | 2010050911 | 3/2010 |
| JP | 2010278519 | 12/2010 |
| JP | 2011066677 | 3/2011 |
| JP | 2014525187 | 9/2014 |
| JP | 2015516747 | 6/2015 |
| JP | 2016197823 | 11/2016 |
| KR | 1020140131926 | 11/2014 |
| KR | 10-1705940 | 2/2017 |
| KR | 10-2027741 | 10/2019 |
| KR | 10-2081922 | 2/2020 |
| KR | 10-2240333 | 4/2021 |
| RU | 2330325 | 7/2008 |
| RU | 2371881 | 10/2009 |
| TW | 200822760 | 5/2008 |
| WO | WO2008036237 | 3/2008 |
| WO | WO2009119888 | 10/2009 |
| WO | WO2010063184 | 6/2010 |
| WO | WO2010146782 | 12/2010 |
| WO | WO2011042645 | 4/2011 |
| WO | WO2011045339 | 4/2011 |
| WO | WO2011046339 | 4/2011 |
| WO | WO2011052142 | 5/2011 |
| WO | WO2011004577 | 12/2012 |
| WO | WO2012175870 | 12/2012 |
| WO | WO2013153226 | 10/2013 |
| WO | WO2013010997 | 1/2016 |

OTHER PUBLICATIONS

Bossen, "Common Test Conditions and Software Reference Configurations," 5th JCT-VC Meeting, Geneva, Mar. 2011 (JCTVC-E700), 11 pages.

Clare et al., "Wavefront and Cabac Flush: Different Degrees of Parallelism Without Transcoding," Joint Collaborative Team on Video Coding (JCT-VC) of ITU-T SG16 WP3 and ISO/IEC JTC1/SC29/WG11 6th Meeting: Torino, IT, Jul. 14-22, 2011, [JCTVC-F275], ITU-T, Jul. 1, 2011, JCTVC-F275 (version 1), pp. 1-11.

Clare et al., "Wavefront Parallel Processing for HEVC Encoding and Decoding," JCT-VC Meeting, 97, MPEG Meeting, Jul. 14, 2011-Jul. 22, 2011; Torino; (Joint Collaborative Team on Video Coding of ISO/IEC JTC1/SC29/WG11 and ITU-T SG.16 No. JCTVC-F274, (Jul. 1, 2011), 16 pages, XP030009297.

EP Extended European Search Report in European Application No. 20155879.8, dated Jul. 28, 2020, 13 pages.

EP Extended European Search Report in European Application No. 20175631.9, dated Jul. 10, 2020, 20 pages (with Machine Translation).

Fuldseth et al., "Tiles," 5th JCT-VC Meeting, Geneva, Mar. 2011 (JCTVC-E408), 14 pages.

Henry and Pateux, "Wavefront Parallel Processing," 5th JCT-VC Meeting, Geneva, Mar. 2011 (JCTVC-E196), 9 pages.

Hirashima et al., "The Effect of FMO for a QoE-based Video Output Scheme on QoE in Audio-Video IP Transmission," EICE Tech. Rep., Jul. 2009, vol. 109, No. 121, pp. 7-12 (English Abstract only).

Huang et al., "Ordered Entropy Slices for Parallel CODEC," 38. VCEG Meeting; 89. MPEG Meeting; Jul. 1-8, 2009; London, UK & Geneva, CH; (Video Coding Experts Group of ITU-T SG. 16), No. VCEG-AL25, Jul. 5, 2009 (Jul. 5, 2009), XP030003706.

Huang et al., "Ordered Entropy Slices for Parallel CODEC," ITU-T SG 16 Q.6 Video Coding Experts Group 38th Meeting. VCEG-AL25 rev.1, Jul. 5, 2009, pp. 1-10.

International Preliminary Report on Patentability issued in PCT/FR2012/051391, dated Dec. 23, 2013, 7 pages (in French).

International Preliminary Report on Patentability issued in PCT/FR2012/050380 dated Sep. 13, 2013, 6 pages (in French).

International Search Report and Written Opinion dated Aug. 1, 2012 for corresponding International Application No. PCT/FR2012/051391, filed Jun. 20, 2012.

International Search Report issued in PCT/FR2012/050380 dated May 8, 2012, with English translation, 7 pages.

International Search Report issued in PCT/FR2012/051391, dated Aug. 9, 2012, with English translation, 7 pages.

International Search Report issued in PCT/JP2009-056778, 4 pages.

ISO/IEC JTC1/SC29 WG1, JPEG 2000, "Coding of Still Pictures: JPEG 2000 Part 1 020719 (Final Publication Draft)," Project 1.29.15444 (JPEG 2000), ITU-T Rec. T.800 (2002), N2678, Jul. 19, 2002, 245 pages.

Kato et al., "VLSI Architecture of Multi-Symbol CABAC Decoder for H.264/AVC High Profile," IEICE technical report, vol. 107, No. 289, The Institute of Electronics, Information and Communication Engineers, Oct. 18, 2007, pp. 65-70, ISSN:0913-5685.

Lee, et al., "High-Efficiency Video Compression Framework Based on Flexible Unit Representation," Proceedings of the second APSIPA Annual Summit and Conference, Dec. 17, 2010, pp. 6523-6631.

Li, "Image Compression—The Mechanics of the JPEG 2000," retrieved from URL<http://research.microsoft.com/en-us/um/people/jinl/papers_2002/ms . . . , >, 20 pages.

Marpe et al., "Context-Based Adaptive Binary Arithmetic Coding in the H.264/AVC Video Compression Standard," IEEE Transactions on Circuits and Systems for Video Technology, IEEE Service Center, Piscataway, NJ, USA, vol. 13, No. 7, Jul. 1, 2003, pp. 620-636.

Marpe et al., "Improved CABAC," 15. VCEG Meeting; 58; MPEG Meeting; Dec. 4-6, 2011; Pattaya, Th; (Video Coding Experts Group of ITU-T SG.16), No. VCEG-018, Nov. 28, 2001, pp. 1-6, XP030003351.

Marpe et al., "Context-based Adaptive Binary Arithmetic Coding in the H.264/AVC Video Compression Standard," IEEE Trans. on CSVT, Jul. 2003, vol. 13, No. 7, pp. 620-636.

Misra and Segall, "Periodic Initialization for Wavefront Coding Functionality," 4th JCT-VC Meeting, Daegu, Jan. 2011 (JCTVC-D073), 7 pages.

Misra et al., "Entropy Slices for Parallel Entropy Coding," JCTVC-C256, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 6 pages.

Misra et al., "Lightweight slicing for entropy coding," 4th JCT-VC Meeting, Daegu, Jan. 2011 (JCTVC-D070), 7 pages.

Moccagatta, "Arbitrary Slice Order and Flexible Macroblock Order Impact of AVC Compliance and Implementation Complexity," Joint Video Team (JVT) of ISO/IEC MPEG & ITU-T VCEG (ISO/IEC JTC1/SC29/WG11 and ITU-T SG16 Q.6) 4th Meeting: Klagenfurt, Austria, Jul. 22-26, 2002, [JVT-DI 15], ITU-T, Jan. 17, 2005, pp. 1-9.

NTT DOCOMO, Inc. et al., "Annex A CDCM Video Codec: Decoder Specification," Joint Collaborative Team on Video Coding (JCT-VG) of ITU-T SG16 WP3 and ISO/IEC JTC1/SC29/WG11, 1st Meeting: Dresden, DE, Apr. 15-23, 2010, pp. 1-107 (Apr. 2010).

(56) References Cited

OTHER PUBLICATIONS

Okubo et al., "Impress Standard Textbook Series Revised Third Edition H.264, AVC Subject," Book, 1st Edition, Jan. 1, 2009, Impress R & D Co., Ltd., pp. 153-162 (English Abstract only).
Rissanen et al. "Universal Modeling and Coding", IEEE Transactions on Information Theory, vol. IT-27, No. 1, Jan. 1981, pp. 12-23.
Saito et al., "HD-SDI H.264 Super-Low Delay Encoder/Decoder 'EHH-1000E/D' and its application," Eizo Joho Industrial, No. Feb. 2009 (vol. 41, No. 2), Sangyo Kaihatsukiko Inc., Feb. 1, 2009, pp. 15 to 20, ISSN: 1346-1362.
Schwarz et al., "CABAC and Slices" 4. JVT Meeting; Jul. 22-26, 2002; Klagenfurt, Austria; (Joint Video Team of ISO/IEC MPEG & ITO/T VCEG-ISO/IEC JTC1/SC29/WG11 and ITU-T SG. 16 0.6), No. JVT-D020r1 Jul. 22, 2002 (Jul. 22, 2002), pp. 1-17, XP002671680.
Segall et al., "Video coding technology proposal by Sharp," JCT-VC Meeting; Apr. 15, 2010-Apr. 23, 2010, Dresden; (Joint Collaborative Team on Video Coding of ISO/IEC JTC1/SC29/WG11 and ITU-TSG.16) No. JCTVC-A105, Apr. 22, 2010 XP030007535, pp. 25-28.
Sekiguchi, "Next Generation Video Coding (HEVC) Standardization Trends," Journal of the Institute of Image Information and Television Engineers, Mar. 1, 2011, 65th volume No. 3, 302-308, (with Machine Translation).
Sharp, "Entropy slices for parallel entropy decoding," ITU-T SG16 Meeting, Apr. 22, 2008-Feb. 5, 2008, Geneva, pp. 1-9 (Apr. 14, 2008).
Sze and Budagavi, "Analysis of entropy slice approaches," 4th JCT-VC Meeting, Daegu, Jan. 2011, (JCTVC-D243), 6 pages.
Sze et al., "Massively Parallel CABAG," 38th VCEG Meeting, 89 MPEG Meeting, Jul. 1, 2009-Jul. 8, 2009, London, Geneva (Video Coding Experts Group of ITU-T SG. 16), pp. 1-10 (Jul. 3, 2009).
Wiegan et al., "Overview of the H.264/AVC Video Coding Standard," IEEE Transactions on Circuits and Systems for Video Technology, Jul. 2003, 13(7):560-576.
Written Opinion issued in PCT/FR2012/051391, dated Aug. 9, 2012, with English Translation, 14 pages.
Written Opinion of the International Searching Authority issued in PCT/FR2012/050380 dated May 8, 2012, with English translation, 11 pages.
Zhao et al., "New Results using Entropy Slices for Parallel Decoding", [online], Jul. 18, 2008, ITU—Telecommunications Standardization Sector Study Group 16 Question 6 Video Coding Experts Group (VCEG), Document: VCEG-AI32.
U.S. Appl. No. 16/907,561, filed Jun. 22, 2020, Henry.
U.S. Appl. No. 16/435,317, filed Jun. 7, 2019, Henry.
U.S. Appl. No. 16/012,658, filed Jun. 19, 2018, Henry.
U.S. Appl. No. 15/486,660, filed Apr. 13, 2017, Henry.
U.S. Appl. No. 15/008,614, filed Jan. 28, 2016, Henry.
U.S. Appl. No. 14/662,395, filed Mar. 19, 2015, Henry.
U.S. Appl. No. 14/492,750, filed Sep. 22, 2014, Henry.
U.S. Appl. No. 14/128,949, filed Apr. 21, 2014, Henry.
JP Decision on Opposition in JP Appln. No. 2018-145539, dated Jul. 1, 2022, 139 pages (with Machine Translation).
Zhao et al., "Parallel entropy decoding for high-resolution video coding," Proc. SPIE 7257, Visual Communications and Image Processing, Jan. 18, 2009, 11 pages.
Wikipedia.com [online], "Lempel-Ziv-Welch," available on or before Aug. 10, 2009, via Internet Archive: Wayback Machine URL<https://web.archive.org/web/20090810074931/https://en.wikipedia.org/wiki/Lempel%E2%80%93Ziv%E2%80%93Welch>, 7 pages.
Okubo, "Impress Standard Textbook Series—3rd Revision of H.264/AVC Textbook," 1st Edition, Jan. 1, 2009, Impress R&D, Japan, p. 86-87, (8 pages with Machine Translation).
JP Opposition in JP Appln. No. 2018-145539, dated Nov. 19, 2021, 160 pages (with Machine Translation).

\* cited by examiner

METHOD OF CODING AND DECODING IMAGES, CODING AND DECODING DEVICE AND COMPUTER PROGRAMS CORRESPONDING THERETO

CROSS-REFERENCE TO RELATED APPLICATIONS

This application is a continuation of U.S. application Ser. No. 16/895,192, filed Jun. 8, 2020, which is a continuation of U.S. application Ser. No. 16/418,343, filed May 21, 2019, now U.S. Pat. No. 10,681,376, which is a continuation of U.S. application Ser. No. 15/419,870, filed Jan. 30, 2017, now U.S. Pat. No. 10,382,784, which is a continuation of U.S. application Ser. No. 15/003,148 filed Jan. 21, 2016, now U.S. Pat. No. 9,628,818, which is a continuation of U.S. application Ser. No. 14/492,546, filed Sep. 22, 2014, now U.S. Pat. No. 9,271,012, which is a continuation of U.S. application Ser. No. 14/003,014, filed Sep. 4, 2013, now U.S. Pat. No. 9,560,380, which is the U.S. national phase of International Patent Application No. PCT/FR2012/050380, filed Feb. 23, 2012, which claims the benefit of French Application No. 1151849, filed Mar. 7, 2011. The entire contents each of the foregoing are incorporated herein by reference.

FIELD OF THE INVENTION

The present invention pertains generally to the field of image processing, and more precisely to the coding and to the decoding of digital images and of sequences of digital images.

The invention can thus, especially, be applied to the video coding implemented in current video coders (MPEG, H.264, etc) or forthcoming video coders (ITU-T/VCEG) (H.265) or ISO/MPEG (HVC).

BACKGROUND OF THE INVENTION

Current video coders (MPEG, H264, etc.) use a block-wise representation of the video sequence. The images are cut up into macro-blocks, each macro-block is itself cut up into blocks and each block, or macro-block, is coded by intra-image or inter-image prediction. Thus, certain images are coded by spatial prediction (intra prediction), while other images are coded by temporal prediction (inter prediction) with respect to one or more coded-decoded reference images, with the aid of a motion compensation known by the person skilled in the art. Moreover, for each block can be coded a residual block corresponding to the original block decreased by a prediction. The coefficients of this block are quantized after optional transformation, and then coded by an entropy coder.

Intra prediction and inter prediction require that certain blocks which have been previously coded and decoded are available, so as to be used, either at the decoder or at the coder, to predict the current block. A schematic example of such a predictive coding is represented in FIG. 1A, in which an image $I_N$ is divided into blocks, a current block $MB_i$ of this image being subjected to a predictive coding with respect to a predetermined number of three blocks $MBr_1$, $MBr_2$ and $MBr_3$ previously coded and decoded, such as designated by the hatched arrows. The aforementioned three blocks specifically comprise the block $MBr_1$ situated immediately to the left of the current block $MB_i$, and the two blocks $MBr_2$ and $MBr_3$ situated respectively immediately above and to the above right of the current block $MB_i$.

Of more particular interest here is the entropy coder. The entropy coder encodes the information in its order of arrival. Typically a row-by-row traversal of the blocks is carried out, of "raster-scan" type, as illustrated in FIG. 1A by the reference PRS, starting from the block at the top left of the image. For each block, the various items of information necessary for the representation of the block (type of block, mode of prediction, residual coefficients, etc.) are dispatched sequentially to the entropy coder.

An effective arithmetical coder of reasonable complexity is already known, called "CABAC" ("Context Adaptive Binary Arithmetic Coder"), introduced into the AVC compression standard (also known as ISO-MPEG4 part 10 and ITU-T H.264).

This entropy coder implements various concepts;
arithmetical coding: the coder, such as described initially in the document J. Rissanen and G. G. Langdon Jr, "Universal modeling and coding," IEEE Trans. Inform. Theory, vol. IT-27, pp. 12-23, January 1981, uses, to code a symbol, a probability of occurrence of this symbol;
adaptation to context: this entails adapting the probability of occurrence of the symbols to be coded. On the one hand, on-the-fly learning is carried out. On the other hand, according to the state of the previously coded information, a specific context is used for the coding. To each context there corresponds an inherent probability of occurrence of the symbol. For example a context corresponds to a type of coded symbol (the representation of a coefficient of a residual, signaling of coding mode, etc.) according to a given configuration, or a state of the neighborhood (for example the number of "intra" modes selected from the neighborhood, etc.);
binarization: the symbols to be coded are cast into the form of a string of bits. Subsequently, these various bits are successively dispatched to the binary entropy coder.

Thus, this entropy coder implements, for each context used, a system for learning probabilities on the fly with respect to the previously coded symbols for the context considered. This learning is based on the order of coding of these symbols. Typically, the image is traversed according to an order of "raster-scan" type, described hereinabove.

During the coding of a given symbol b that may equal 0 or 1, the learning of the probability Pi of occurrence of this symbol is updated for a current block $MB_1$ in the following manner:

$$p_i(b=0) = \alpha \cdot p_{i-1}(b=0) + \begin{cases} (1-\alpha) & \text{if coded bits is 0} \\ 0 & \text{if otherwise} \end{cases}$$

where $\alpha$ is a predetermined value, for example 0.95 and Pi-1 is the probability of symbol occurrence calculated during the last occurrence of this symbol.

A schematic example of such an entropy coding is represented in FIG. 1A, in which a current block $MB_i$ of the image $I_N$ is subjected to an entropy coding. When the entropy coding of the block $MB_i$ begins, the symbol occurrence probabilities used are those obtained after coding of a previously coded and decoded block, which is that which immediately precedes the current block $MB_i$ in accordance with the aforementioned row-by-row traversal of the blocks of "raster scan" type. Such a learning based on block-by-block dependency is represented in FIG. 1A for certain blocks only for the sake of clarity of the figure, by the thin-line arrows.

The drawback of such a type of entropy coding resides in the fact that during the coding of a symbol situated at the start of a row, the probabilities used correspond mainly to those observed for the symbols situated at the end of the previous row, having regard to the "raster scan" traversal of the blocks. Now, on account of the possible spatial variation of the probabilities of the symbols (for example for a symbol related to an item of motion information, the motion situated in the right part of an image may be different from that observed in the left part and therefore likewise for the local probabilities stemming therefrom), a lack of local appropriateness of the probabilities may be observed, with the risk of causing a loss of effectiveness during coding.

The document "Annex A: CDCM Video Codec Decoder Specification" available at the Internet address http://wftp3.itu.int/av-arch/jctvc-site/2010-04_A_Dresden/JCTVC-0-AnnexA.doc (on 8 Feb. 2011) describes a coding method which alleviates the drawback mentioned above. The coding method described in the above document comprises, as illustrated in FIG. 1B:

a step of cutting an image $I_N$ into a plurality of blocks,
a step of predictive coding of a current block $MB_i$ of this image with respect to a predetermined number of three blocks $MBr_1$, $MBr_2$ and $MBr_3$ previously coded and decoded, such as designated by the hatched arrows. The aforementioned three blocks specifically comprise the block $MBr_1$ situated immediately to the left of the current block $MB_i$, and the two blocks $MBr_2$ and $MBr_3$ situated respectively immediately above and to the above right of the current block $MB_i$,
a step of entropy coding of the blocks of the image IN, according to which each block uses the probabilities of symbol occurrence calculated respectively for the coded and decoded block which is situated immediately above the current block and for the coded and decoded block which is situated immediately to the left of the current block, when these blocks are available. This use of the probabilities of symbol occurrence is represented partially in FIG. 1B, for the sake of clarity of the latter, by the thin-line arrows.

The advantage of such an entropy coding is that it exploits the probabilities arising from the immediate environment of the current block, thereby making it possible to achieve higher coding performance. Furthermore, the coding technique used makes it possible to code in parallel a predetermined number of pairwise neighboring subsets of blocks. In the example represented in FIG. 1B, three subsets SE1, SE2 and SE3 are coded in parallel, each subset consisting in this example of a row of blocks, represented dashed. Of course, such a coding requires that the blocks situated respectively above and above to the right of the current block be available.

A drawback of this parallel coding technique is that, to allow access to a probability of symbol occurrence calculated for the block situated immediately above the current block, it is necessary to store a quantity of probabilities associated with a row of blocks. If the second row of blocks SE2 is considered for example in FIG. 1B, the first block of this row is subjected to an entropy coding by using the probabilities of symbol occurrence calculated for the first block of the previous first row SE1. On completion of the coding of the first block of the second row, the state of the value V1 of probability of occurrence is stored in a buffer memory MT. The second block of the second row SE2 is thereafter subjected to an entropy coding by using the probabilities of symbol occurrence calculated at one and the same time for the second block of the first row SE1 and the first block of the second row SE2. On completion of the coding of the second block of the second row, the state of the value V2 of probability of occurrence is stored in the buffer memory MT. This procedure is undertaken until the last block of the second row SE2. Since the quantity of probabilities is very large (there exist as many probabilities as the combination of the number of syntax elements with the number of associated contexts), the storage of these probabilities over an entire row is expensive in terms of memory resources.

SUBJECT AND SUMMARY OF THE INVENTION

One of the aims of the invention is to remedy drawbacks of the aforementioned prior art.

For this purpose, a subject of the present invention relates to a method of coding at least one image comprising the steps of:

cutting of the image into a plurality of blocks,
grouping of the blocks into a predetermined number of subsets of blocks,
coding in parallel of each of said subsets of blocks, the blocks of a subset considered being coded according to a predetermined sequential order of traversal, said coding step comprising, for a current block of a subset considered, the sub-steps of:
predictive coding of the current block with respect to at least one previously coded and decoded block,
entropy coding of the current block by learning of at least one probability of symbol occurrence.

The method according to the invention is noteworthy in that:

in the case where the current block is the first block to be coded of a subset considered, the probability of symbol occurrence is that which was calculated for a coded and decoded predetermined block of at least one other subset,
in the case where the current block is a block of the subset considered, other than the first block, the probability of symbol occurrence is that which was calculated for at least one coded and decoded block belonging to the same subset.

Such an arrangement makes it possible to store in the buffer memory of the coder a much smaller quantity of probabilities of occurrence of symbols, since the entropy coding of a current block other than the first block of a subset of blocks no longer necessarily requires the use of the probabilities of symbol occurrence calculated for a previously coded and decoded block which is situated above a current block in another subset.

Such an arrangement furthermore makes it possible to maintain the existing compression performance, since the entropy coding of a current block uses probabilities of symbol occurrence calculated for another previously coded and decoded block of the subset to which the current block belongs, and that consequently a learning has already been carried out through the updating of the probabilities so that the latter are in accordance with the statistics of the video signal.

The main advantage of using the probabilities of symbol occurrence calculated for the first block of said other subset during the entropy coding of the first current block of a considered subset of blocks is that of economizing on the coders buffer memory by storing in the latter just the update of said probabilities of occurrence of symbols, without taking into account the symbol occurrence probabilities learned by the other consecutive blocks of said other subset.

The main advantage of using the symbol occurrence probabilities calculated for a block of said other subset, other than the first block, for example the second block, during the entropy coding of the first current block of a considered subset of blocks is that of obtaining more precise and therefore better learning of the probabilities of occurrence of symbols, thereby giving rise to better video compression performance.

In a particular embodiment, the coded and decoded block belonging to the same subset as the current block to be coded other than the first block of the subset is that which is the nearest neighbor of the current block to be coded.

Such an arrangement thus makes it possible to store just the symbol occurrence probabilities learned during the entropy coding of a first block of a subset considered, since in this particular case, account is taken only of the symbol occurrence probability calculated for the block situated above the first current block and belonging to another subset. This results in optimization of the reduction in the size of the coder's memory resources.

In another particular embodiment, in the case where the predictive coding of a block of a subset considered is intended to be performed with respect to a predetermined number of previously coded and decoded blocks of a subset other than said subset considered, the parallel coding of the blocks of said subset considered is performed with a shift by said predetermined number of blocks with respect to the subset of blocks immediately preceding in the order in which the parallel coding is performed.

Such an arrangement allows the achieving, for a current subset of blocks to be coded, a synchronization of the progress of processing of the blocks of the subset of blocks preceding the current subset in the order in which the parallel coding is performed, thereby making it possible to guarantee the availability of the block or blocks of the preceding subset which are used for the coding of a current block. In this manner, the step of verifying the availability of this or these blocks of the preceding subset, such as are implemented in parallel coders of the prior art, can advantageously be omitted, thereby allowing an acceleration of the processing time required to process the blocks in the coder according to the invention.

Correlatively, the invention further relates to a device for coding at least one image comprising:
  means for cutting the image into a plurality of blocks,
  means for grouping the blocks into a predetermined number of subsets of blocks,
  means for parallel coding of each of the subsets of blocks, the blocks of a subset considered being coded according to a predetermined sequential order of traversal, the coding means comprising, for a current block of a subset considered:
    sub-means of predictive coding of the current block with respect to at least one previously coded and decoded block,
    sub-means of entropy coding of the current block on the basis of at least one probability of symbol occurrence.

Such a coding device is noteworthy in that:
  in the case where the current block is the first block to be coded of a subset considered, the sub-means of entropy coding take account, for the entropy coding of the first current block, of the probability of symbol occurrence which was calculated for a coded and decoded predetermined block of at least one other subset,
  in the case where the current block is a block of the subset considered, other than the first block of the latter, the sub-means of entropy coding take account, for the entropy coding of the current block, of the probability of symbol occurrence which was calculated for at least one coded and decoded block belonging to the same subset.

In a corresponding manner, the invention also relates to a method of decoding a stream representative of at least one coded image, comprising the steps of:
  identification in the image of a predetermined number of subsets of blocks to be decoded,
  parallel decoding of parts of the stream that are associated with each of the subsets of blocks, the blocks of a subset considered being decoded according to a predetermined sequential order of traversal, the decoding step comprising, for a current block of a subset considered, the sub-steps of:
    entropy decoding of the current block on the basis of at least one probability of symbol occurrence
    predictive decoding of the current block with respect to at least one previously decoded block.

Such a decoding method is noteworthy in that:
  in the case where the current block is the first block to be decoded of a subset considered, the probability of symbol occurrence is that which was calculated for a decoded predetermined block of at least one other subset,
  in the case where the current block is a block of the subset considered, other than the first block of the latter, the probability of symbol occurrence is that which was calculated for at least one decoded block belonging to the same subset.

In a particular embodiment, the decoded block belonging to the same subset as the current block to be decoded other than the first block of the subset is that which is the nearest neighbor of the current block to be decoded.

In another particular embodiment, in the case where the predictive decoding of a block of a subset considered is intended to be performed with respect to a predetermined number of previously coded and decoded blocks of a subset other than the subset considered, the parallel decoding of the blocks of the subset considered is performed with a shift by the predetermined number of blocks with respect to the subset of blocks immediately preceding in the order in which the parallel decoding is performed.

Correlatively, the invention further relates to a device for decoding a stream representative of at least one coded image, comprising:
  identification means for identifying in the image a predetermined number of subsets of blocks to be decoded,
  means of parallel decoding of parts of the stream that are associated with each of the subsets of blocks, the blocks of a subset considered being decoded according to a predetermined sequential order of traversal, the decoding means comprising, for a current block of a subset considered:
    sub-means of entropy decoding of the current block on the basis of at least one probability of symbol occurrence,
    sub-means of predictive decoding of the current block with respect to at least one previously decoded block.

Such a decoding device is noteworthy in that:
  in the case where the current block is the first block to be decoded of a subset considered, the sub-means of entropy decoding take account, for the entropy decoding of the first current block, of the probability of symbol occurrence which was calculated for a decoded predetermined block of at least one other subset, in the case where the current block is a block of the subset considered, other than the first block of the latter, the sub-means of entropy decoding take account, for the entropy decoding of the current block, of the probability of symbol occurrence which was calculated for at least one decoded block belonging to the same subset.

The invention is also aimed at a computer program comprising instructions for the execution of the steps of the coding or decoding method hereinabove, when the program is executed by a computer.

Such a program can use any programming language, and be in the form of source code, object code, or of code intermediate between source code and object code, such as in a partially compiled form, or in any other desirable form.

Yet another subject of the invention is also aimed at a recording medium readable by a computer, and comprising computer program instructions such as mentioned hereinabove.

The recording medium can be any entity or device capable of storing the program. For example, such a medium can comprise a storage means, such as a ROM, for example a CD ROM or a microelectronic circuit ROM, or else a magnetic recording means, for example a diskette (floppy disk) or a hard disk.

Moreover, such a recording medium can be a transmissible medium such as an electrical or optical signal, which can be conveyed via an electrical or optical cable, by radio or by other means. The program according to the invention can be in particular downloaded on a network of Internet type.

Alternatively, such a recording medium can be an integrated circuit into which the program is incorporated, the circuit being adapted for executing the method in question or to be used in the execution of the latter.

The coding device, the decoding method, the decoding device and the computer programs aforementioned present at least the same advantages as those conferred by the coding method according to the present invention.

BRIEF DESCRIPTION OF THE DRAWINGS

Other characteristics and advantages will become apparent on reading two preferred embodiments described with reference to the figures in which.

DETAILED DESCRIPTION OF AN EMBODIMENT OF THE CODING PART

An embodiment of the invention will now be described, in which the coding method according to the invention is used to code a sequence of images according to a binary stream close to that obtained by a coding according to the H.264/MPEG-4 AVC standard. In this embodiment, the coding method according to the invention is for example implemented in a software or hardware manner by modifications of a coder initially in accordance with the H.264/MPEG-4 AVC standard. The coding method according to the invention is represented in the form of an algorithm comprising steps C1 to C5, represented in FIG. 2A.

Figure 3A:
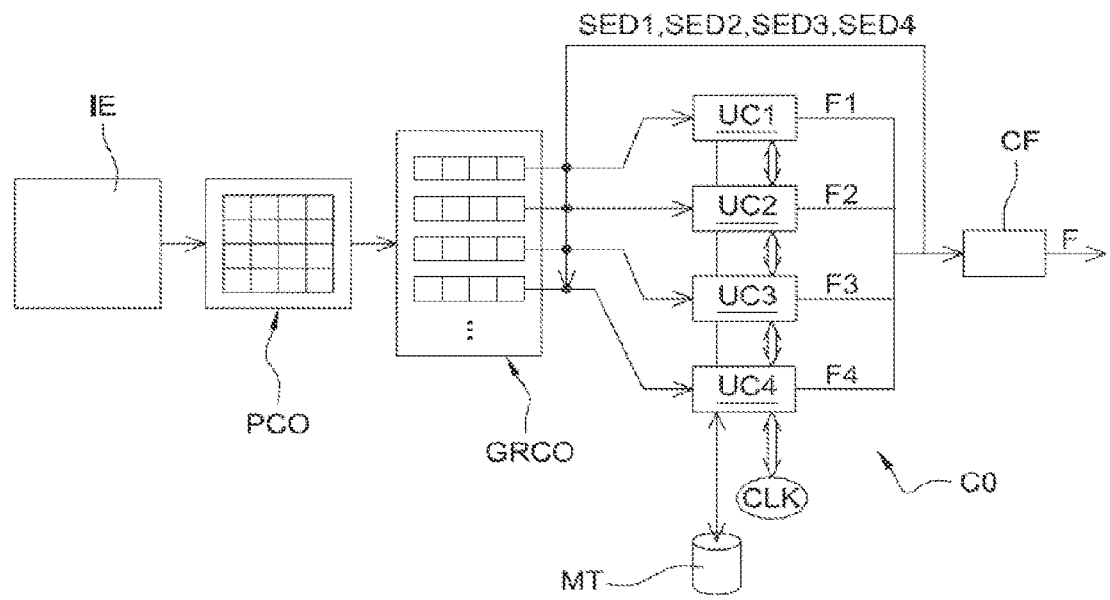
FIG. 3A represents an embodiment of a coding device according to the invention.

According to the embodiment of the invention, the coding method according to the invention is implemented in a coding device CO represented in FIG. 3A.

Figure 1A:
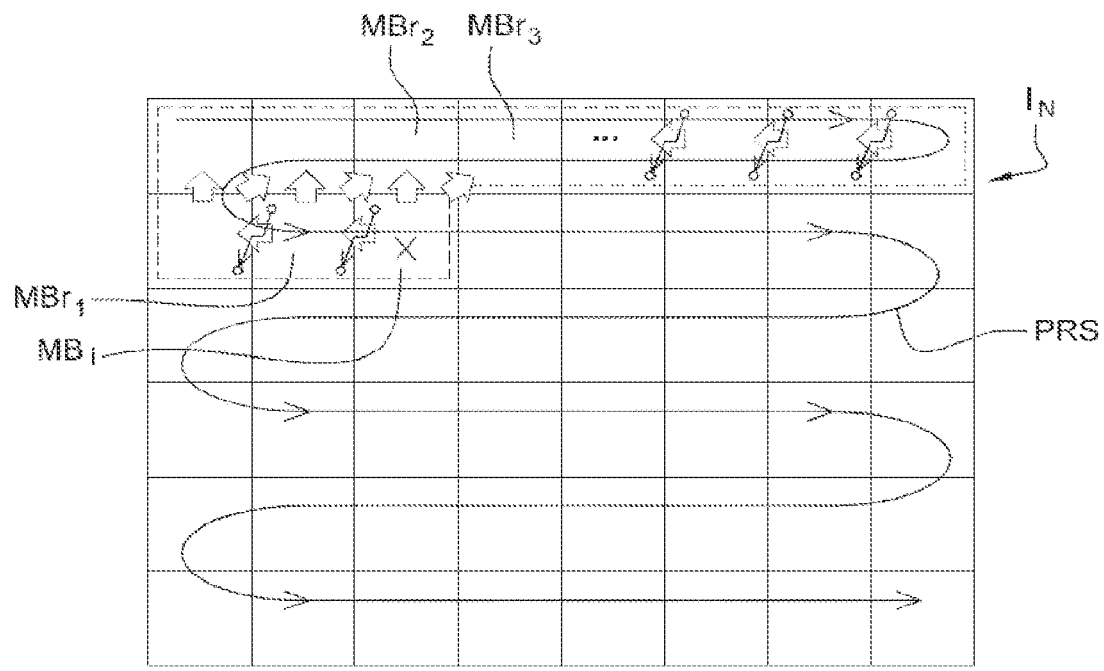
FIG. 1A represents an image coding diagram of the prior art according to a first example.
Figure 1B:
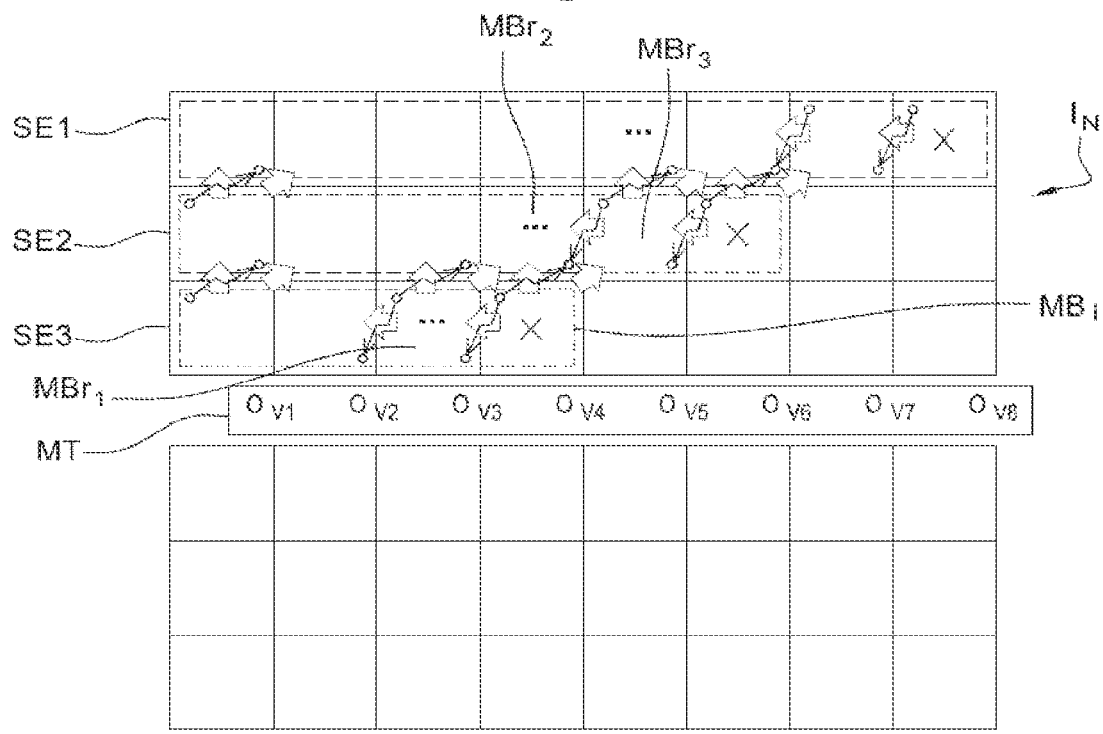
FIG. 1B represents an image coding diagram of the prior art according to a second example.
Figure 2A:
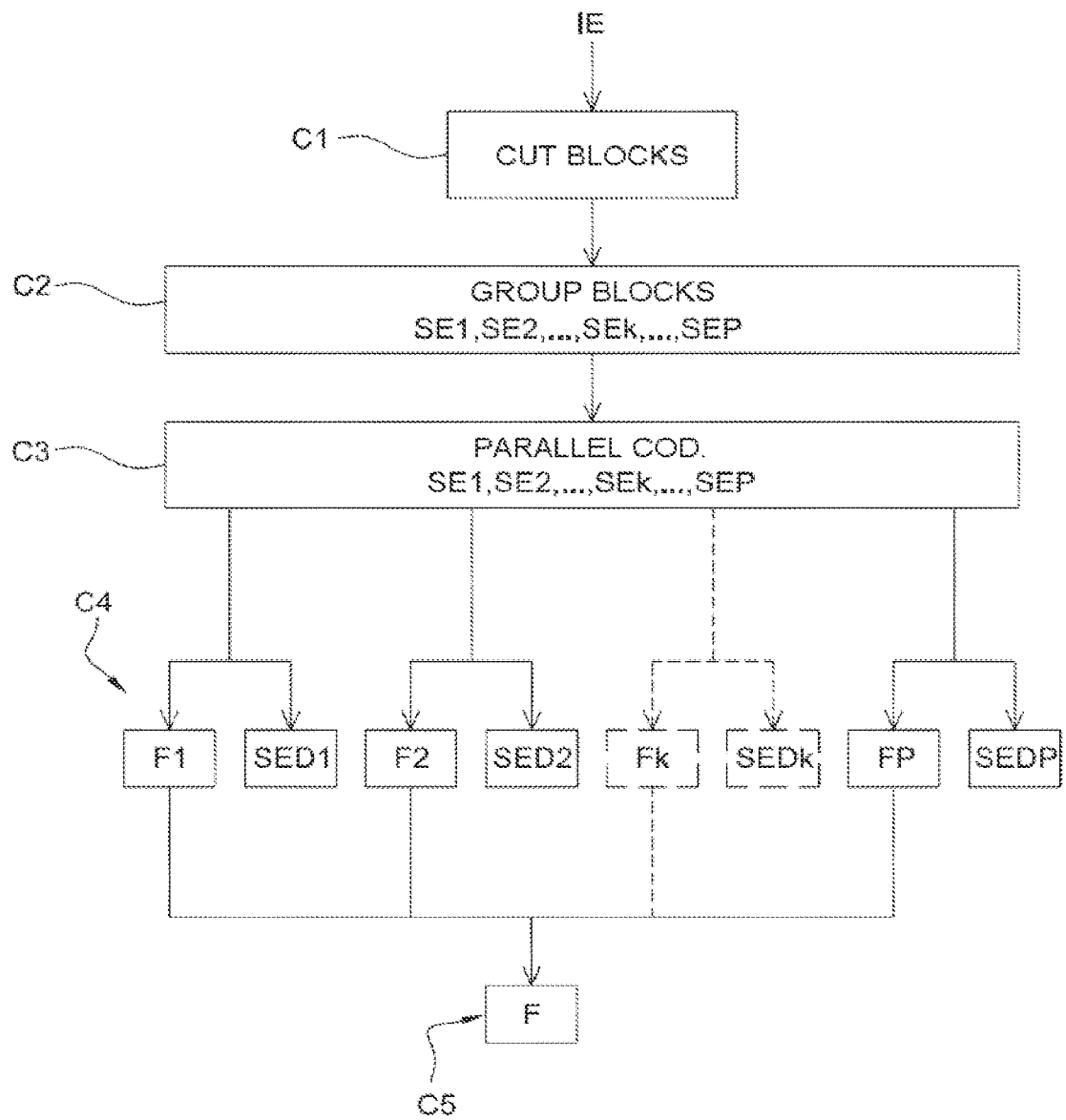
FIG. 2A represents the main steps of the coding method according to the invention.
Figure 4A:
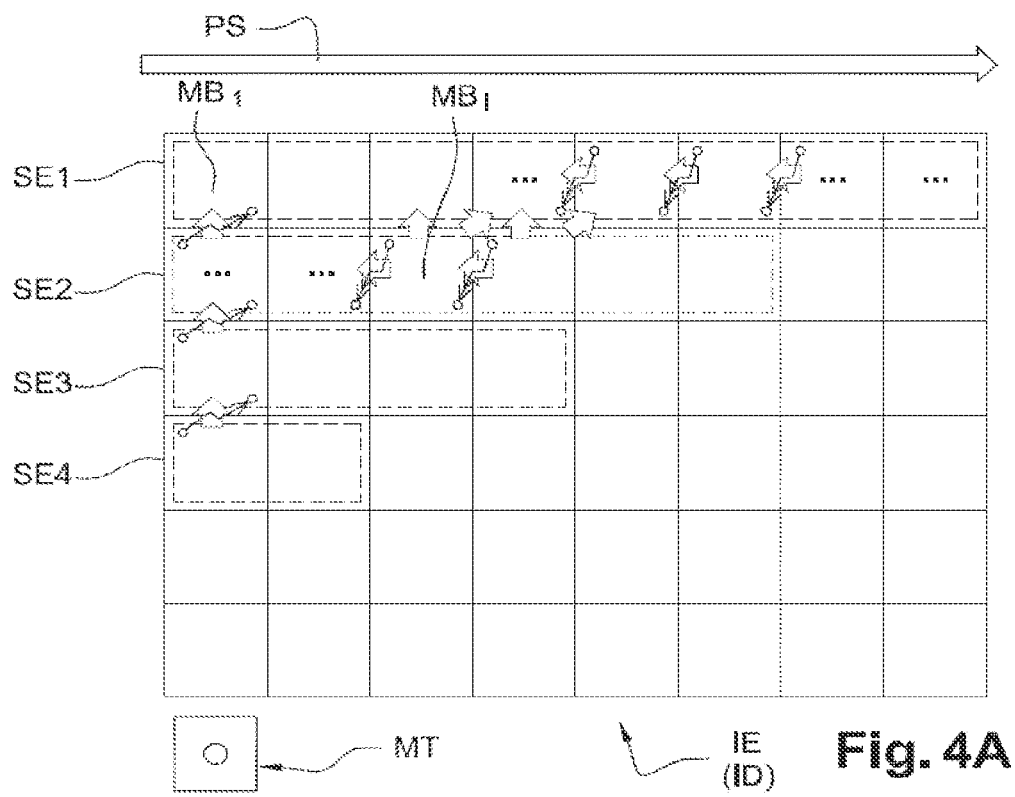
FIG. 4A represents an image coding/decoding diagram according to a first preferential embodiment.
Figure 4B:
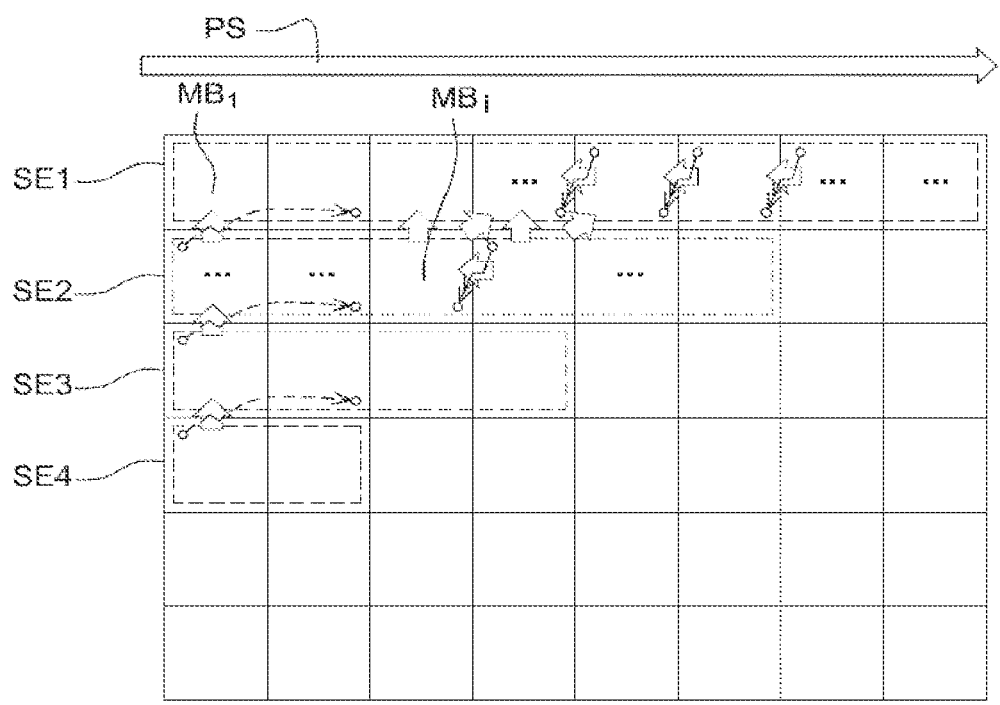
FIG. 4B represents an image coding/decoding diagram according to a second preferential embodiment.

With reference to FIG. 2A, the first coding step C1 is the cutting of an image IE of a sequence of images to be coded into a plurality of blocks or macro-blocks $MB_i$ as represented in FIG. 4A or 4B. In the examples represented, said blocks MB have a square shape and all have the same size. As a function of the size of the image which is not necessarily a multiple of the size of the blocks, the last blocks on the left and the last blocks at the bottom may not be square. In an alternative embodiment, the blocks can be for example of rectangular size and/or not aligned with one another.

Each block or macroblock can moreover itself be divided into sub-blocks which are themselves subdividable.

Such a cutting is performed by a partitioning module PCO represented in FIG. 3A which uses for example a partitioning algorithm well known as such.

With reference to FIG. 2A, the second coding step C2 is the grouping of the aforementioned blocks into a predetermined number P of consecutive subsets of blocks SE1, SE2, ..., SEk, ..., SEP intended to be coded in parallel. In the examples represented in FIGS. 4A and 4B, the predetermined number P is equal to 4 and the four subsets SE1, SE2, SE3, SE4, represented dashed, consist respectively of the first four rows of blocks of the image IE.

Such a grouping is performed by a calculation module GRCO represented in FIG. 3A, with the aid of an algorithm well known per se.

With reference to FIG. 2A, the third coding step C3 consists in the coding in parallel of each of said subsets of blocks SE1, SE2, SE3 and SE4, the blocks of a subset considered being coded according to a predetermined sequential order of traversal PS. In the examples represented in FIGS. 4A and 4B, the blocks of a current subset SEk ($1 \leq k \leq 4$) are coded one after the other, from left to right, as indicated by the arrow PS.

Such a coding in parallel is implemented by a number R of coding units UCk ($1 \leq k \leq R$) with R=4 as represented in FIG. 3A and allows a substantial acceleration of the coding method. In a manner known as such, the coder CO comprises a buffer memory MT which is adapted for containing the symbol occurrence probabilities such as progressively updated in tandem with the coding of a current block.

Figure 3B:
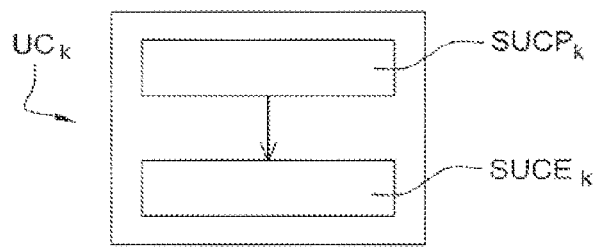
FIG. 3B represents a coding unit for the coding device of FIG. 3A.

As represented in greater detail in FIG. 3B, each of the coding units UCk comprises:

a sub-unit for predictive coding of a current block with respect to at least one previously coded and decoded block, denoted SUCPk;

a sub-unit for entropy coding of said current block by using at least one probability of symbol occurrence calculated for said previously coded and decoded block, denoted SUCEk.

The predictive coding sub-unit SUCPk is able to perform a predictive coding of the current block, according to the conventional prediction techniques, such as for example in Intra and/or Inter mode.

The entropy coding sub-unit SUCEk is for its part of CABAC type, but modified according to the present invention, as will be described further on in the description.

As a variant, the entropy coding sub-unit SUCEk could be a Huffman coder known as such.

In the examples represented in FIGS. 4A and 4B, the first unit UC1 codes the blocks of the first row SE1, from left to right. When it reaches the last block of the first row SE1, it passes to the first block of the (N+1)st row, here the 5 row, etc. The second unit UC2 codes the blocks of the second row SE2, from left to right. When it reaches the last block of the second row SE2, it passes to the first block of the (N+2)nd row, here the 6th row, etc. This traversal is repeated until the unit UC4, which codes the blocks of the fourth row SE4, from left to right. When it reaches the last block of the first row, it passes to the first block of the (N+4)th row, here the 8th row, and so on and so forth until the last block of the image IE is coded.

Other types of traversal than that which has just been described hereinabove are of course possible. Thus, it is possible to cut the image IE into several sub-images and to independently apply a cutting of this type to each sub-image. It is also possible for each coding unit to process not nested rows, as explained hereinabove, but nested columns. It is also possible to traverse the rows or columns in either direction.

With reference to FIG. 2A, the fourth coding step C4 is the production of N sub-bitstreams Fk (1≤k≤N) representing the processed blocks compressed by each of the aforementioned coding units, as well as a decoded version of the processed blocks of each subset SEk. The decoded processed blocks of a subset considered, denoted SED1, SED2, . . . , SEDk, . . . , SEDP may be reused by some of the coding units UC1, UC2, . . . , UCk, . . . , UCP represented in FIG. 3A, according to a synchronization mechanism which will be detailed further on in the description.

With reference to FIG. 2A, the fifth coding step C5 consists in constructing a global stream F on the basis of the aforementioned sub-streams Fk. According to one embodiment, the sub-streams Fk are simply juxtaposed, with an extra information item intended to indicate to the decoder the location of each sub-stream Fk in the global stream F. The latter is transmitted by a communication network (not represented), to a remote terminal. The latter comprises the decoder DO represented in FIG. 6A.

Thus, as will be described in detail further on in the description, the decoder according to the invention is able to isolate the sub-streams Fk within the global stream F and to assign them to each component decoding unit of the decoder. It will be noted that such a decomposition of the sub-streams into global stream is independent of the choice of the use of several coding units operating in parallel, and that it is possible with this approach to have just the coder or just the decoder which comprises units operating in parallel.

Such a construction of the global stream F is implemented in a stream construction module CF, such as represented in FIG. 3A.

Figure 2B:
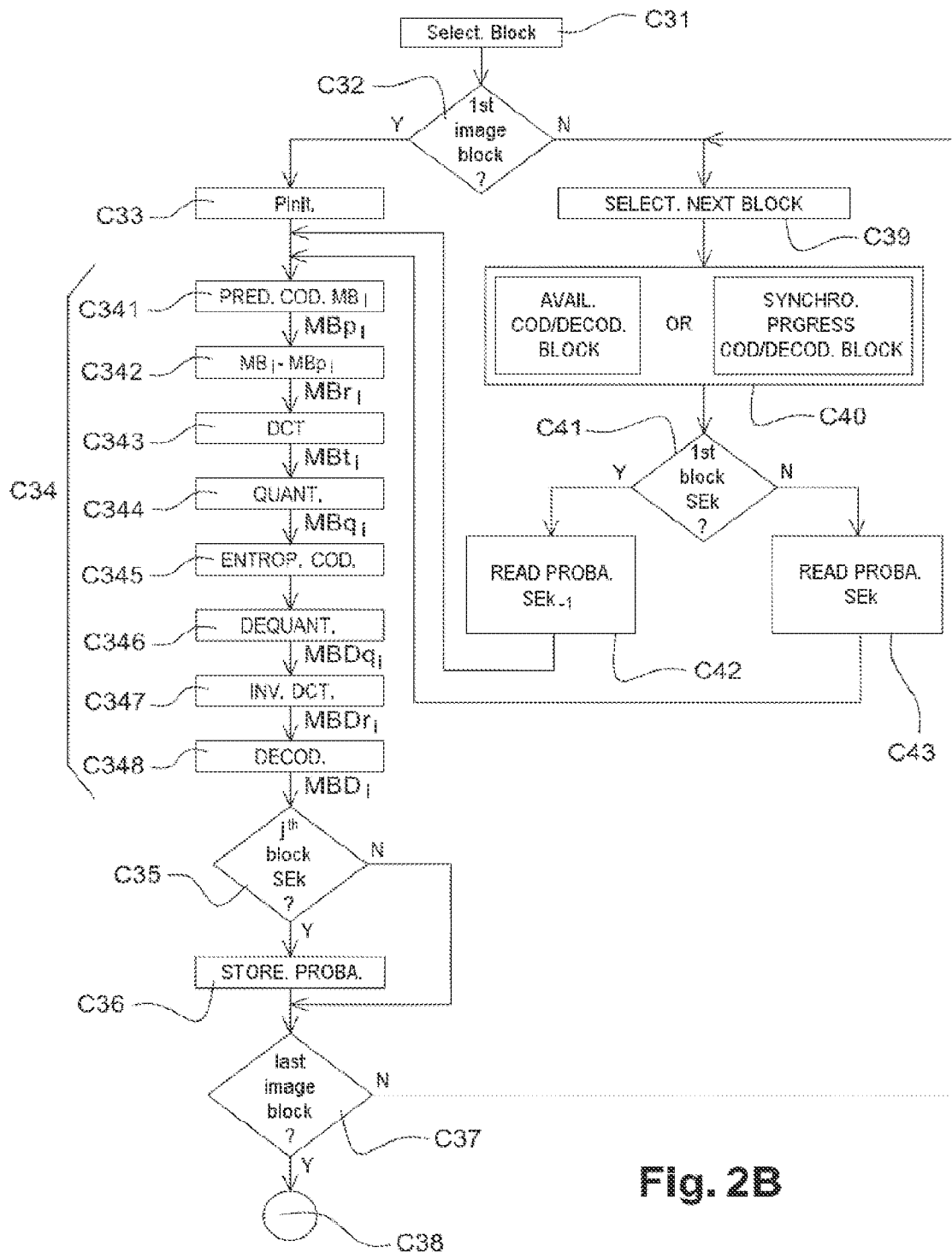
FIG. 2B represents in detail the parallel coding implemented in the coding method of FIG. 2A.

The various specific sub-steps of the invention, such as are implemented during the aforementioned parallel coding step C3, in a coding unit UCk, will now be described with reference to FIG. 2B.

In the course of a step C31, the coding unit UCk selects as current block tie first block to be coded of a current row SEk represented in FIG. 4A or 4B.

In the course of a step C32, the unit UCk tests whether the current block is the first block (situated at the top and on the left) of the image IE which has been cut up into blocks in the aforementioned step C1.

If such is the case, in the course of a step C33, the coding probabilities are initialized to values Pinit previously defined in the coder CO of FIG. 3A.

If such is not the case, there is undertaken, in the course of a step C40 which will be described later in the subsequent description, the determination of the availability of the necessary previously coded and decoded blocks.

In the course of a step C34, there is undertaken the coding of the first current block MB1 of the first row SE1 represented in FIG. 4A or 4B. Such a step C34 comprises a plurality of sub-steps C341 to C348 which will be described hereinbelow.

In the course of a first sub-step C341, there is undertaken the predictive coding of the current block MB1 by known techniques of intra and/or inter prediction, in the course of which the block MB1 is predicted with respect to at least one previously coded and decoded block.

It goes without saying that other modes of intra prediction such as proposed in the H.264 standard are possible.

The current block MB1 can also be subjected to a predictive coding in inter mode, in the course of which the current block is predicted with respect to a block arising from a previously coded and decoded image. Other types of prediction are of course conceivable. Among the possible predictions for a current block, the optimal prediction is chosen according to a rate distortion criterion well known to the person skilled in the art.

Said aforementioned predictive coding step makes it possible to construct a predicted block $MBp_1$ which is an approximation of the current block $MB_1$. The information relating to this predictive coding will subsequently be written into the stream F transmitted to the decoder DO. Such information comprises especially the type of prediction (inter or intra), and if appropriate, the mode of intra prediction, the type of partitioning of a block or macroblock if the latter has been subdivided, the reference image index and the displacement vector used in the inter prediction mode. This information is compressed by the coder CO.

In the course of a following sub-step C342, there is undertaken the subtraction of the predicted block $MBp_1$ from the current block $MB_1$ to produce a residual block $MBr_1$.

In the course of a following sub-step C343, there is undertaken the transformation of the residual block $MBr_1$ according to a conventional operation of direct transformation such as for example a discrete cosine transformation of DCT type, to produce a transformed block $MBt_1$.

In the course of a following sub-step C344, there is undertaken the quantization of the transformed block $MBt_1$ according to a conventional quantization operation, such as for example a scalar quantization. A block of quantized coefficients $MBq_1$ is then obtained.

In the course of a following sub-step C345, there is undertaken the entropy coding of the block of quantized coefficients $MBq_1$. In the preferred embodiment, this entails a CABAC entropy coding.

In the course of a following sub-step C346, there is undertaken the dequantization of the block $MBq_1$ according to a conventional dequantization operation, which is the operation inverse to the quantization performed in step C344. A block of dequantized coefficients $MBDq_1$ is then obtained.

In the course of a following sub-step C347, there is undertaken the inverse transformation of the block of dequantized coefficients $MBDq_1$ which is the operation inverse to the direct transformation performed in step C343 hereinabove. A decoded residual block $MBDr_1$ is then obtained.

In the course of a following sub-step C348, there is undertaken the construction of the decoded block $MBD_1$ by adding to predicted block MBp1 the decoded residual block $MBDr_1$. It should be noted that the latter block is the same as the decoded block obtained on completion of the method of decoding the image IE which will be described further on in the description. The decoded block $MBD_1$ is thus rendered available to be used by the coding unit UC1 or any other coding unit forming part of the predetermined number R of coding units.

On completion of the aforementioned coding step C34, the entropy coding sub-unit SUCEk such as represented in FIG. 3B contains all the probabilities such as progressively updated in tandem with the coding of the first block. These probabilities correspond to the various possible syntax elements and to the various associated coding contexts.

Subsequent to the aforementioned coding step C34, a test is performed, in the course of a step C35, to determine whether the current block is the jth block of this same row, were j is a known predetermined value of the coder CO which is at least equal to 1.

If such is the case, in the course of a step C36, the set of probabilities calculated for the jth block is stored in the buffer memory MT of the coder CO such as represented in FIG. 3A and in FIGS. 4A and 4B, the size of said memory being suitable for storing the calculated number of probabilities.

In the course of a step C37, the unit UCk tests whether the current block of the row SEk which has just been coded is the last block of the image IE.

If such is the case, in the course of a step C38, the coding method is ended.

If such is not the case, there is undertaken, in the course of step C39, the selection of the following block $MB_1$ to be coded in accordance with the order of traversal represented by the arrow PS in FIG. 4A or 4B.

If in the course of step C35, the current block is not the jth block of the row SEk considered, then step C37 hereinabove is undertaken.

In the course of a step C40, there is undertaken the determination of the availability of previously coded and decoded blocks which are necessary for coding the current block $MB_1$. Having regard to the fact that this entails a parallel coding of the blocks of the image IE by different coding units UCk, it may be that these blocks were not coded and decoded by the coding unit assigned to the coding of these blocks and that they are therefore not yet available. Said determining step consists in verifying whether a predetermined number N' of blocks situated in the previous row SEk−1, for example the two blocks situated respectively above and above to the right of the current block, are available for the coding of the current block, that is to say if they have already been coded and then decoded by the coding unit UCk−1 assigned to their coding. Said determining step also consists in verifying the availability of at least one block situated to the left of the current block to be coded $MB_1$. However, having regard to the order of traversal PS chosen in the embodiment represented in FIG. 4A or 4B, the blocks are coded one after the other in a row SEk considered. Consequently, the left coded and decoded block is always available (with the exception of the first block of a row). In the example represented in FIG. 4A or 4B, this entails the block situated immediately to the left of the current block to be coded. For this purpose, only the availability of the two blocks situated respectively above and above to the right of the current block is tested.

This test step being liable to slow the coding method, in an alternative manner in accordance with the invention, a clock CLK represented in FIG. 3A is adapted for synchronizing the progress of the coding of the blocks so as to guarantee the availability of the two blocks situated respectively above and above to the right of the current block, without it being necessary to verify the availability of these two blocks. Thus, as represented in FIG. 4A or 4B, a coding unit UCk always begins to code the first block with a shift by a predetermined number N' (here N'=2) of coded and decoded blocks of the previous row SEk−1 which are used for the coding of the current block. From a software point of view, the implementation of such a clock makes it possible to noticeably accelerate the processing time required to process the blocks of the image IE in the coder CO.

In the course of a step C41, a test is performed to determine whether the current block is the first block of the row SEk considered.

If such is the case, in the course of a step C42, there is undertaken the reading in the buffer memory MT solely of the symbol occurrence probabilities calculated during the coding of the jth block of the previous row SEk−1.

According to a first variant represented in FIG. 4A, the jth block is the first block of the previous row SEk−1 (j=1). Such a reading consists in replacing the probabilities of the CABAC coder with that present in the buffer memory MT. Dealing as one is with the first respective blocks of the second, third and fourth rows SE2, SE3 and SE4, this reading step is delineated in FIG. 4A by the arrows represented by thin lines.

According to a second variant of the aforementioned step C42 which is illustrated in FIG. 4B, the jth block is the second block of the previous row SEk−1 (j=2). Such a reading consists in replacing the probabilities of the CABAC coder with that present in the buffer memory MT. Dealing as one is with the first respective blocks of the second, third and fourth rows SE2, SE3 and SE4, this reading step is delineated in FIG. 4B by the arrows represented by thin dashed lines.

Subsequent to step C42, the current block is coded and then decoded by iteration of steps C34 to C38 described above.

If subsequent to the aforementioned step C41, the current block is not the first block of the row SEk considered, there is advantageously not undertaken the reading of the probabilities arising from the previously coded and decoded block which is situated in the same row SEk, that is to say the coded and decoded block situated immediately to the left of the current block, in the example represented. Indeed, having regard to the sequential traversal of reading PS of the blocks situated in the same row, as represented in FIG. 4A or 4B, the symbol occurrence probabilities present in the CABAC coder when beginning the coding of the current block are exactly that which are present after coding/decoding of the preceding block in this same row.

Consequently, in the course of a step C43, there is undertaken the learning of the probabilities of symbol occurrence for the entropy coding of said current block, which correspond solely to those which were calculated for said preceding block in the same row, as is represented by the double solid arrows in FIG. 4A or 4B.

Subsequent to step C43, the current block is coded and then decoded by iteration of steps C34 to C38 described above.

Detailed Description of an Embodiment of the Decoding Part

An embodiment of the decoding method according to the invention will now be described, in which the decoding method is implemented in a software or hardware manner by modifications of a decoder initially in accordance with the H.264/MPEG-4 AVC standard.

Figure 5A:
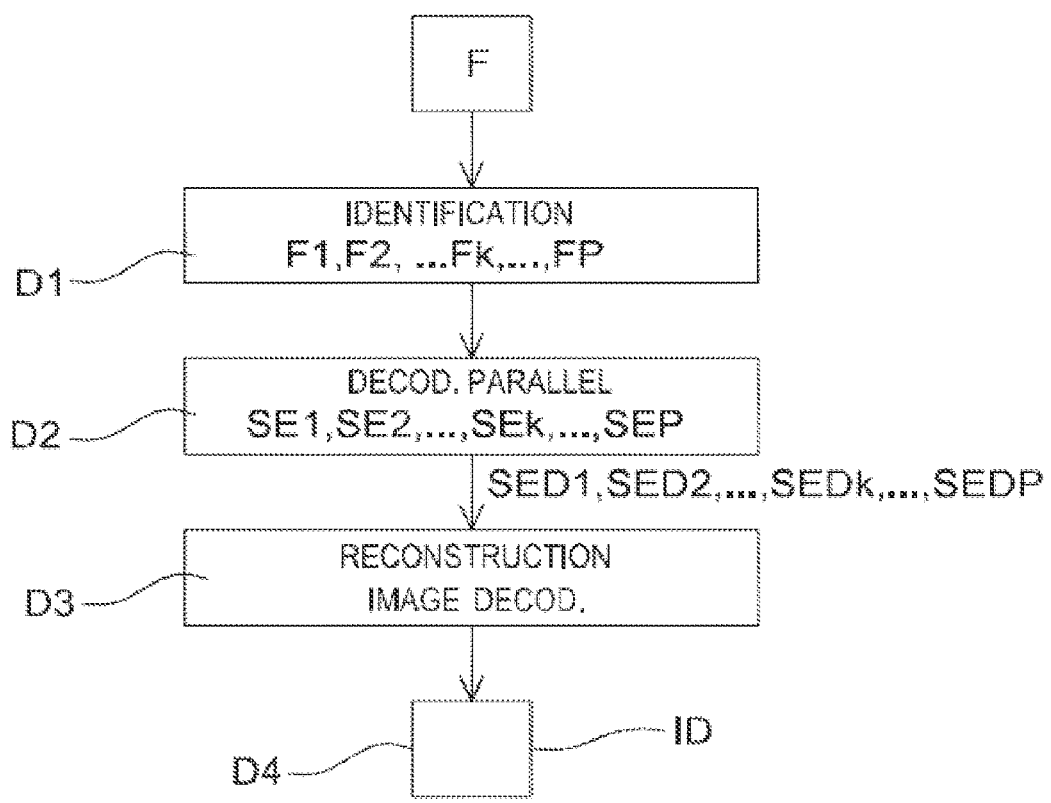
FIG. 5A represents the main steps of the decoding method according to the invention.

The decoding method according to the invention is represented in the form of an algorithm comprising steps D1 to D4, represented in FIG. 5A.

Figure 6A:
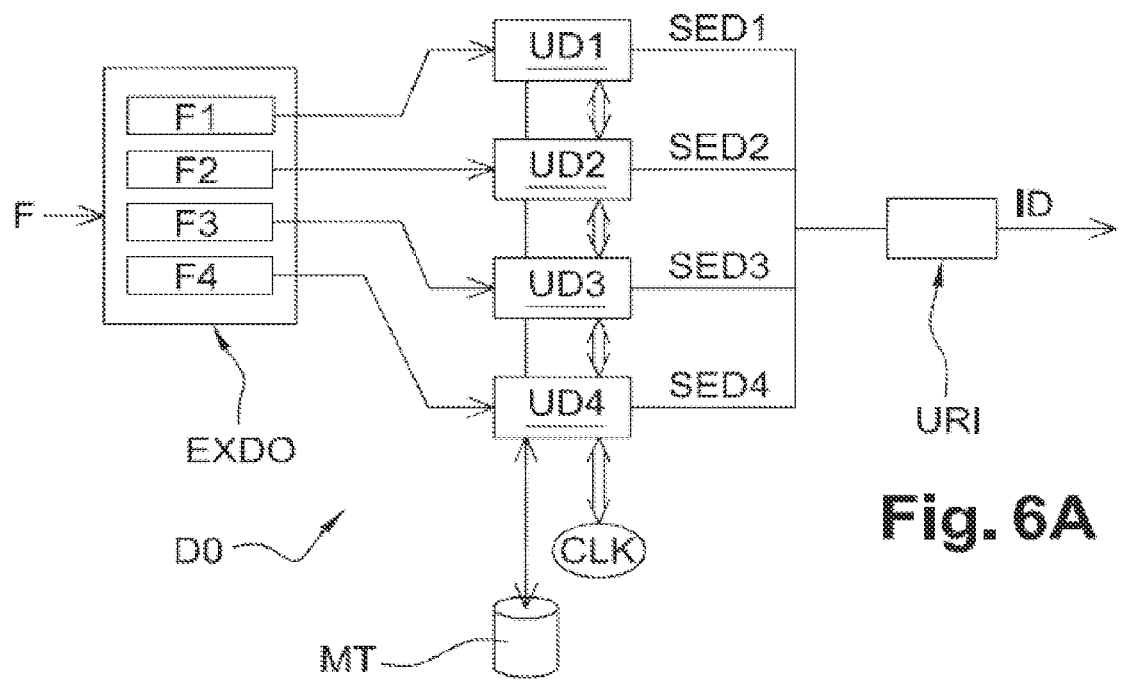
FIG. 6A represents an embodiment of a decoding device according to the invention.

According to the embodiment of the invention, the decoding method according to the invention is implemented in a decoding device DO represented in FIG. 6A.

With reference to FIG. 5A, the first decoding step D1 is the identification in said stream F of the N sub-streams F1, F2, ..., Fk, ..., FP containing respectively the N subsets SE1, SE2, ..., SEk, ..., SEP of previously coded blocks or macro-blocks $MB_i$ as represented in FIG. 4A or 4B. For this purpose, each sub-stream Fk in the stream F is associated with an indicator intended to allow the decoder DO to determine the location of each sub-stream Fk in the stream F. In the example represented, said blocks MB have a square shape and all have the same size. As a function of the size of the image which is not necessarily a multiple of the size of the blocks, the last blocks on the left and the last blocks at the bottom may not be square. In an alternative embodiment, the blocks can be for example of rectangular size and/or not aligned with one another.

Each block or macroblock can moreover itself be divided into sub-blocks which are themselves subdividable.

Such an identification is performed by a stream extraction module EXDO such as represented in FIG. 6A.

In the example represented in FIG. 4A or 4B, the predetermined number is equal to 4 and the four subsets SE1, SE2, SE3, SE4 are represented dashed.

With reference to FIG. 5A, the second decoding step D2 is the decoding in parallel of each of said subsets of blocks SE1, SE2, SE3 and SE4, the blocks of a subset considered being coded according to a predetermined sequential order of traversal PS. In the example represented in FIG. 4A or 4B, the blocks of a current subset SEk (1≤k≤4) are decoded one after the other, from left to right, as indicated by the arrow PS. On completion of step D2, the subsets of decoded blocks SED1, SED2, SED3, ..., SEDk, ..., SEDP are obtained.

Such a decoding in parallel is implemented by a number R of decoding units UDk (1≤k≤R) with R=4 as represented in FIG. 6A and allows a substantial acceleration of the decoding method. In a manner known as such, the decoder DO comprises a buffer memory MT which is adapted for containing the probabilities of occurrence of symbols such as progressively updated in tandem with the decoding of a current block.

Figure 6B:
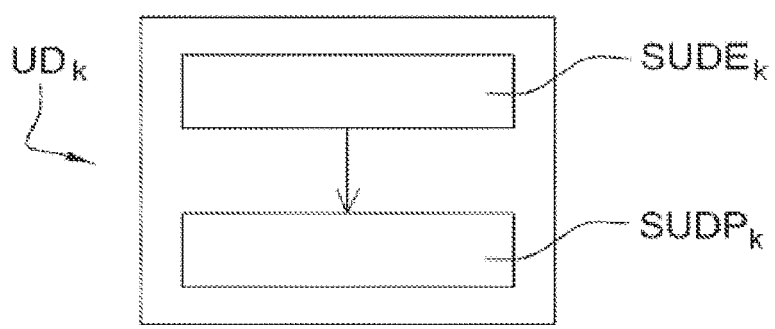
FIG. 6B represents a decoding unit for the decoding device of FIG. 6A.

As represented in greater detail in FIG. 6B, each of the decoding units UDk comprises:

a sub-unit for entropy decoding of said current block by learning of at least one probability of symbol occurrence calculated for at least one previously decoded block, denoted SUDEk, a sub-unit for predictive decoding of a current block with respect to said previously decoded block, denoted SUDPk.

The predictive decoding sub-unit SUDPk is able to perform a predictive decoding of the current block, according to the conventional prediction techniques, such as for example in Intra and/or Inter mode.

The entropy decoding sub-unit SUDEk is for its part of CABAL type, but modified according to the present invention, as will be described further on in the description.

As a variant, the entropy decoding sub-unit SUDEk could be a Huffman decoder known as such.

In the example represented in FIG. 4A or 4B, the first unit UD1 decodes the blocks of the first row SE1, from left to right. When it reaches the last block of the first row SE1, it passes to the first block of the (N+1)' row, here the $5^{th}$ row, etc. The second unit UC2 decodes the blocks of the second row SE2, from left to right. When it reaches the last block of the second row SE2, it passes to the first block of the (N+2)' row, here the 6th row, etc. This traversal is repeated until the unit UD4, which decodes the blocks of the fourth row SE4, from left to right. When it reaches the last block of the first row, it passes to the first block of the $(N+4)^{th}$ row, here the 8th row, and so on and so forth until the last block of the last identified sub-stream is decoded.

Other types of traversal than that which has just been described hereinabove are of course possible. For example, each decoding unit could process not nested rows, as explained hereinabove, but nested columns. It is also possible to traverse the rows or columns in either direction.

With reference to FIG. 5A, the third decoding step D3 is the reconstruction of an image decoded on the basis of each decoded subset SED1, SED2, ..., SEDk, ..., SEDP obtained in the decoding step D2. More precisely, the decoded blocks of each decoded subset SED1, SED2, ..., SEDk, ..., SEDP are transmitted to an image reconstruction unit URI such as represented in FIG. 6A. In the course of this step D3, the unit URI writes the decoded blocks in a decoded image as and when these blocks become available.

In the course of a fourth decoding step D4 represented in FIG. 5A, a fully decoded image ID is delivered by the unit URI represented in FIG. 6A.

Figure 5B:
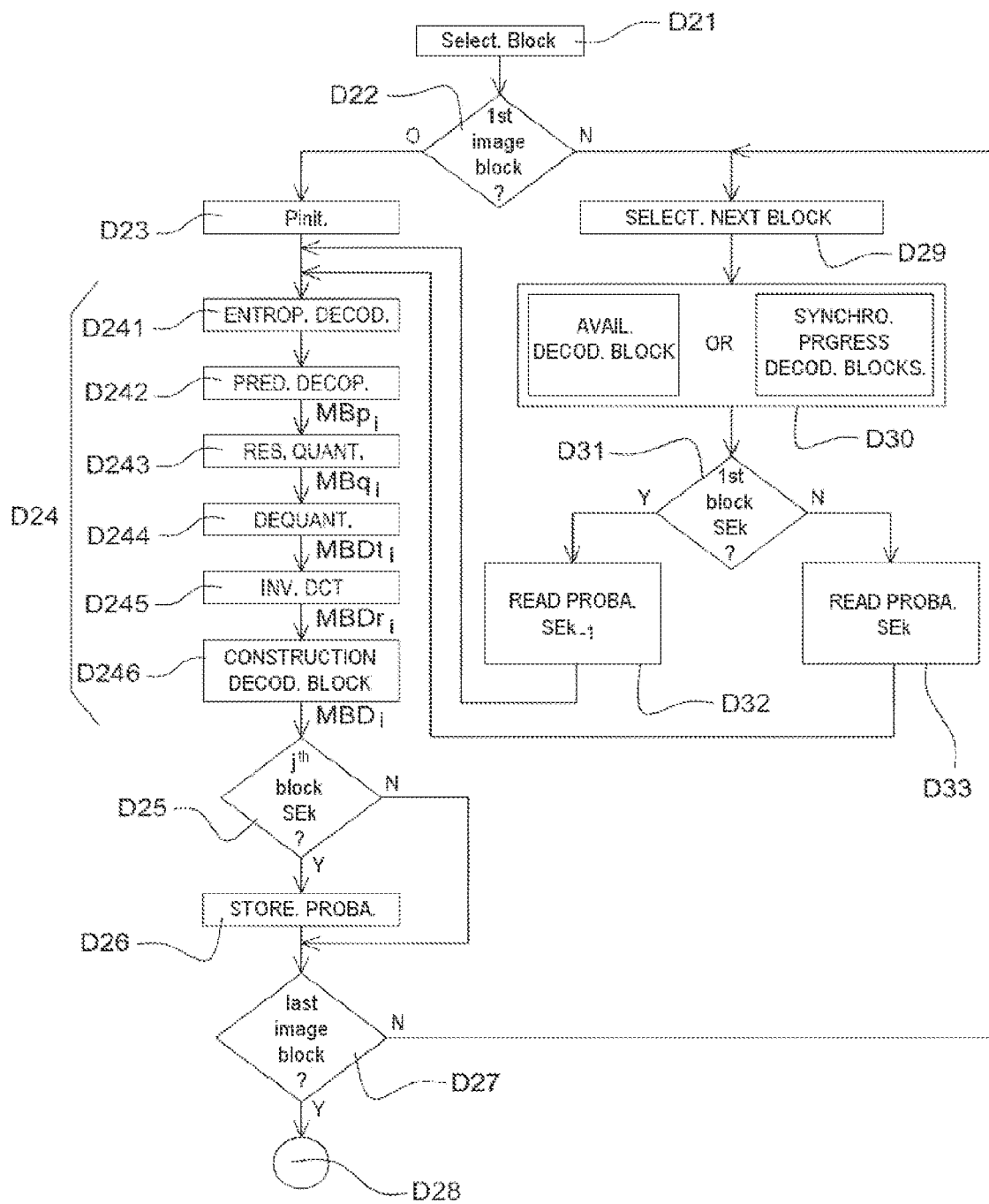
FIG. 5B represents in detail the parallel coding implemented in the decoding method of FIG. 5A.

The various specific sub-steps of the invention, such as are implemented during the aforementioned parallel decoding step D2, in a decoding unit UDk, will now be described with reference to FIG. 5B.

In the course of a step D21, the decoding unit UDk selects as current block the first block to be decoded of the current row SEk represented in FIG. 4A or 4B.

In the course of a step D22, the unit UDk tests whether the current block is the first block of the decoded image, in this instance the first block of the sub-stream F1.

If such is the case, in the course of a step D23, the decoding probabilities are initialized to values Pinit previously defined in the decoder DO of FIG. 6A.

If such is not the case, there is undertaken, in the course of a step D30 which will be described later in the subsequent description, the determination of the availability of the necessary previously decoded blocks.

In the course of a step D24, there is undertaken the decoding of the first current block MB1 of the first row SE1 represented in FIG. 4A or 4B. Such a step D24 comprises a plurality of sub-steps D241 to D246 which will be described hereinbelow.

In the course of a first sub-step D241, there is undertaken the entropy decoding of the syntax elements related to the current block. More precisely, the syntax elements related to the current block are decoded by the CABAC entropy decoding sub-unit SUDE1 such as represented in FIG. 6B. The latter decodes the sub-bitstream F1 of the compressed file to produce the syntax elements, and, at the same time, updates its probabilities in such a way that, at the moment at which this sub-unit decodes a symbol, the probabilities of occurrence of this symbol are identical to those obtained during the coding of this same symbol during the aforementioned entropy coding step C345.

In the course of a following sub-step D242, there is undertaken the predictive decoding of the current block MB1 by known techniques of intra and/or inter prediction, in the course of which the block MB1 is predicted with respect to at least one previously decoded block.

It goes without saying that other modes of intra prediction such as proposed in the H.264 standard are possible.

In the course of this step, the predictive decoding is performed with the aid of the syntax elements decoded in the previous step and comprising especially the type of prediction (inter or intra), and if appropriate, the mode of intra prediction, the type of partitioning of a block or macroblock if the latter has been subdivided, the reference image index and the displacement vector used in the inter prediction mode.

Said aforementioned predictive decoding step makes it possible to construct a predicted block MBp1, In the course of a following sub-step D243, there is undertaken the construction of a quantized residual block $MBq_1$ with the aid of the previously decoded syntax elements, In the course of a following sub-step D244, there is undertaken the dequantization of the quantized residual block $MBq_1$ according to a conventional dequantization operation which is the operation inverse to the quantization performed in the aforementioned step C344, to produce a decoded dequantized block $MBD_{ti}$.

In the course of a following sub-step D245, there is undertaken the inverse transformation of the dequantized block $MBD_{ti}$ which is the operation inverse to the direct transformation performed in step C343 hereinabove. A decoded residual block $MBDr_1$ is then obtained.

In the course of a following sub-step D246, there is undertaken the construction of the decoded block $MBD_1$ by adding to predicted block $MBp_1$ the decoded residual block $MBDr_1$. The decoded block $MBD_1$ is thus rendered available to be used by the decoding unit UD1 or any other decoding unit forming part of the predetermined number N of decoding units.

On completion of the aforementioned decoding step D246, the entropy decoding sub-unit SUDE1 such as represented in FIG. 6B contains all the probabilities such as progressively updated in tandem with the decoding of the first block. These probabilities correspond to the various possible syntax elements and to the various associated decoding contexts.

Subsequent to the aforementioned decoding step D24, a test is performed, in the course of a step D25, to determine whether the current block is the jth block of this same row, where j is a known predetermined value of the decoder DO which is at least equal to 1.

If such is the case, in the course of a step D26, the set of probabilities calculated for the jth block is stored in the buffer memory MT of the decoder DO such as represented in FIG. 6A and in FIG. 4A or 4B, the size of said memory being suitable for storing the calculated number of probabilities.

In the course of a step D27, the unit UDk tests whether the current block which has just been decoded is the last block of the last sub-stream.

If such is the case, in the course of a step D28, the decoding method is ended.

If such is not the case, there is undertaken, in the course of step D29, the selection of the following block $MB_1$ to be decoded in accordance with the order of traversal represented by the arrow PS in FIG. 4A or 4B.

If in the course of the aforementioned step D25, the current block is not the jth block of the row SEDk considered, step D27 hereinabove is undertaken.

In the course of a step D30 which follows the aforementioned step D29, there is undertaken the determination of the availability of previously decoded blocks which are necessary for decoding the current block $MB_1$. Having regard to the fact that this entails a parallel decoding of the blocks by different decoding units UDk, it may be that these blocks were not decoded by the decoding unit assigned to the decoding of these blocks and that they are therefore not yet available. Said determining step consists in verifying whether a predetermined number N' of blocks situated in the previous row SEk−1, for example the two blocks situated respectively above and above to the right of the current block, are available for the decoding of the current block, that is to say if they have already been decoded by the decoding unit UDk−1 assigned to their decoding. Said determining step also consists in verifying the availability of at least one block situated to the left of the current block to be decoded $MB_1$. However, having regard to the order of traversal PS chosen in the embodiment represented in FIG. 4A or 4B, the blocks are decoded one after the other in a row SEk considered. Consequently, the left decoded block is always available (with the exception of the first block of a row). In the example represented in FIG. 4A or 4B, this entails the block situated immediately to the left of the current block to be decoded. For this purpose, only the availability of the two blocks situated respectively above and above to the right of the current block is tested.

This test step being liable to slow the decoding method, in an alternative manner in accordance with the invention, a clock CLK represented in FIG. 6A is adapted for synchronizing the progress of the decoding of the blocks so as to guarantee the availability of the two blocks situated respectively above and above to the right of the current block, without it being necessary to verify the availability of these two blocks. Thus, as represented in FIG. 4A or 4B, a decoding unit UDk always begins to decode the first block with a shift by a predetermined number N' (here N'=2) of decoded blocks of the previous row SEk−1 which are used for the decoding of the current block. From a software point of view, the implementation of such a clock makes it possible to noticeably accelerate the processing time required to process the blocks of each subset SEk in the decoder DO.

In the course of a step D31, a test is performed to determine whether the current block is the first block of the row SEk considered.

If such is the case, in the course of a step D32, there is undertaken the reading in the buffer memory MT solely of the symbol occurrence probabilities calculated during the decoding of the jth block of the previous row SEk-1.

According to a first variant represented in FIG. 4A, the jth block is the first block of the previous row SEk-1 (j=1). Such a reading consists in replacing the probabilities of the CABAC decoder with that present in the buffer memory MT. Dealing as one is with the first respective blocks of the second, third and fourth rows SE2, SE3 and SE4, this reading step is delineated in FIG. 4A by the arrows represented by thin lines.

According to a second variant of the aforementioned step D32 which is illustrated in FIG. 4B, the jth block is the second block of the previous row SEk-1 (j=2). Such a reading consists in replacing the probabilities of the CABAC decoder with that present in the buffer memory MT. Dealing as one is with the first respective blocks of the second, third and fourth rows SE2, SE3 and SE4, this reading step is delineated in FIG. 4B by the arrows represented by thin dashed lines.

Subsequent to step D32, the current block is decoded by iteration of steps D24 to D28 described above.

If subsequent to the aforementioned step D31, the current block is not the first block of the row SEk considered, there is advantageously not undertaken the reading of the probabilities arising from the previously decoded block which is situated in the same row SEk, that is to say the decoded block situated immediately to the left of the current block, in the example represented. Indeed, having regard to the sequential traversal of reading PS of the blocks situated in the same row, as represented in FIG. 4A or 4B, the symbol occurrence probabilities present in the CABAC decoder when beginning the decoding of the current block are exactly that which are present after decoding of the preceding block in this same row.

Consequently, in the course of a step D33, there is undertaken the learning of the probabilities of symbol occurrence for the entropy decoding of said current block, which probabilities correspond solely to those which were calculated for said preceding block in the same row, as represented by the double solid arrows in FIG. 4A or 4B.

Subsequent to step D33, the current block is decoded by iteration of steps D24 to D28 described above.

What is claimed is:

1. An image decoding method comprising:
    receiving a stream representative of at least one coded image;
    identifying, from the stream, a plurality of groups of blocks;
    processing a first block in a particular group of blocks of the plurality of groups of blocks, wherein processing the first block comprises:
        determining that the first block is first in an order of blocks in the particular group of blocks;
        in response to determining that the first block is first in the order of blocks in the particular group of blocks, retrieving a first set of probabilities of occurrence of symbols associated with a block that is second in the order of blocks belonging to another group of blocks that is different from the particular group of blocks in the plurality of groups of blocks;
        entropy decoding the first block based on the first set of probabilities to obtain a quantized residual block;
        dequantizing the quantized residual block to obtain a dequantized block; and
        inverse transforming the dequantized block to obtain a decoded residual block; and
    processing a second block in the particular group of blocks, wherein processing the second block comprises:
        determining that the second block is not first in the order of blocks in the particular group of blocks;
        in response to determining that the second block is not first in the order of blocks in the particular group of blocks, retrieving a second set of probabilities of occurrence of symbols associated with at least one other already decoded block belonging to the particular group of blocks in the plurality of groups of blocks, wherein the second set of probabilities of occurrence of symbols are not associated with blocks that do not belong to the particular group of blocks, and
        entropy decoding the second block based on the second set of probabilities to obtain a quantized residual block;
        dequantizing the quantized residual block to obtain a dequantized block; and
        inverse transforming the dequantized block to obtain a decoded residual block.

2. An image encoding method comprising:
    obtaining residual block of an image;
    transforming the residual block to obtain a transformed block;
    quantizing the transformed block to obtain a block of quantized coefficients; and
    entropy coding the block of quantized coefficients, wherein entropy coding the block of quantized coefficients comprises:
        determining whether the block of quantized coefficients is first in an order of blocks in a particular group of blocks;
        conditioned on determining that the block of quantized coefficients is first in the order of blocks in the particular group of blocks, retrieving a first set of probabilities of occurrence of symbols associated with a second block that is second in the order of blocks belonging to another group of blocks that is different from the particular group of blocks in a plurality of groups of blocks;
        entropy coding the block of quantized coefficients based on the first set of probabilities; and
        conditioned on determining that the block of quantized coefficients is not first in the order of blocks in the particular group of blocks, retrieving a second set of probabilities of occurrence of symbols associated with at least one other already coded block belonging to the particular group of blocks in the predetermined plurality of groups of blocks,
    wherein the second set of probabilities of occurrence of symbols are not associated with blocks that do not belong to the particular group of blocks, and
    wherein entropy coding the second block is based on the second set of probabilities.

* * * * *